(12) United States Patent
Kieschke et al.

(10) Patent No.: US 11,008,052 B2
(45) Date of Patent: May 18, 2021

(54) AIR GUIDING DEVICE FOR A MOTOR VEHICLE

(71) Applicant: Dr. Ing. h.c. F. Porsche Aktiengesellschaft, Stuttgart (DE)

(72) Inventors: Andreas Kieschke, Leonberg (DE); Riccardo Bauer, Owen (DE); Tobias Posch, Wimsheim (DE); Florian Karl, Grabenstaett (DE); Simon Fischer, Quedlinburg (DE); Andreas Wallmann, Oberndorf (AT)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 182 days.

(21) Appl. No.: 16/270,605

(22) Filed: Feb. 8, 2019

(65) Prior Publication Data

US 2019/0248431 A1 Aug. 15, 2019

(30) Foreign Application Priority Data

Feb. 12, 2018 (DE) ...................... 10 2018 103 076.2

(51) Int. Cl.
*B62D 35/00* (2006.01)
(52) U.S. Cl.
CPC .................................. *B62D 35/007* (2013.01)
(58) Field of Classification Search
CPC .............................. B62D 35/007; Y02T 10/82
USPC ................................ 296/180.1, 180.5, 181.5
See application file for complete search history.

(56) References Cited

U.S. PATENT DOCUMENTS

| 4,274,670 A * | 6/1981 | Pitzmann ................. B60J 5/101 |
| | | 296/180.1 |
| 4,323,274 A * | 4/1982 | Soderberg .............. B60J 1/2008 |
| | | 296/180.1 |
| 4,652,036 A * | 3/1987 | Okamoto ............. B62D 35/007 |
| | | 296/180.1 |
| 9,187,138 B2 * | 11/2015 | Newberry ............ B62D 35/007 |
| 9,845,119 B2 * | 12/2017 | Fuchs .................. B62D 35/007 |
| 2011/0169299 A1 | 7/2011 | Goenueldinc |

(Continued)

FOREIGN PATENT DOCUMENTS

| DE | 102010004561 A1 | 7/2011 |
| DE | 102011001054 A1 | 9/2012 |
| DE | 102012223815 A1 | 7/2013 |

*Primary Examiner* — D Glenn Dayoan
*Assistant Examiner* — E Turner Hicks
(74) *Attorney, Agent, or Firm* — Leydig, Voit & Mayer, Ltd.

(57) ABSTRACT

An air guiding device for a motor vehicle includes a rear wing, a wing supporting device configured to secure the rear wing and to forward forces which act on the rear wing, and connecting components configured to connect the rear wing and the wing supporting device to one another. A first of the connecting components is configured as a trough-shaped receiving device on the rear wing and/or the wing supporting device. A second of the connecting components which interacts with the first connecting component is configured as a hammer component on the other of the rear wing and/or the wing supporting device. The hammer component has a hammer handle and a hammer head which is connected to the hammer handle, extends transversely with respect thereto, and is received in the trough-shaped receiving device.

11 Claims, 1 Drawing Sheet

(56) References Cited

U.S. PATENT DOCUMENTS

| | | |
|---|---|---|
| 2012/0223545 A1 | 9/2012 | Goenueldinc |
| 2013/0168998 A1 | 7/2013 | Turner et al. |
| 2015/0063905 A1 | 3/2015 | Wang |
| 2019/0248431 A1* | 8/2019 | Kieschke ............. B62D 35/007 |

* cited by examiner

AIR GUIDING DEVICE FOR A MOTOR VEHICLE

CROSS REFERENCE TO RELATED APPLICATIONS

This application claims benefit to German Patent Application No. DE 10 2018 103 076.2, filed Feb. 12, 2018, which is hereby incorporated by reference herein.

FIELD

The present invention relates to an air guiding device for a motor vehicle and, in particular, a passenger car, the air guiding device comprising two wing components, of which one is configured as a rear wing and one is configured as a wing supporting device.

BACKGROUND

DE 10 2010 004 561 A1 has disclosed a passenger motor vehicle having a rear-side air guiding apparatus, the air guiding apparatus being configured as a wing or spoiler and being mounted at the rear of the vehicle. A bearing element connects a deployment element to the air guiding apparatus, the bearing element being hooked into the air guiding apparatus in a first region and being connected by means of a screw connection to the air guiding apparatus in a second region.

DE 10 2011 001 054 A1 has disclosed a motor vehicle having a rear-side air guiding apparatus, in the case of which motor vehicle the air guiding apparatus is received on a device, a spherical socket being configured on the device and a spherical pin being configured on the air guiding apparatus, which spherical socket and spherical pin are in engagement with one another. Furthermore, the air guiding apparatus is connected by way of adjustable spacer means to the device for receiving and fastening the air guiding apparatus.

SUMMARY

In an embodiment, the present invention provides an air guiding device for a motor vehicle. The air guiding device includes a rear wing, a wing supporting device configured to secure the rear wing and to forward forces which act on the rear wing, and connecting components configured to connect the rear wing and the wing supporting device to one another. A first of the connecting components is configured as a trough-shaped receiving device on one of the rear wing or the wing supporting device. A second of the connecting components which interacts with the first connecting component is configured as a hammer component on the other of the rear wing or the wing supporting device. The hammer component has a hammer handle and a hammer head which is connected to the hammer handle, extends transversely with respect thereto, and is received in the trough-shaped receiving device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
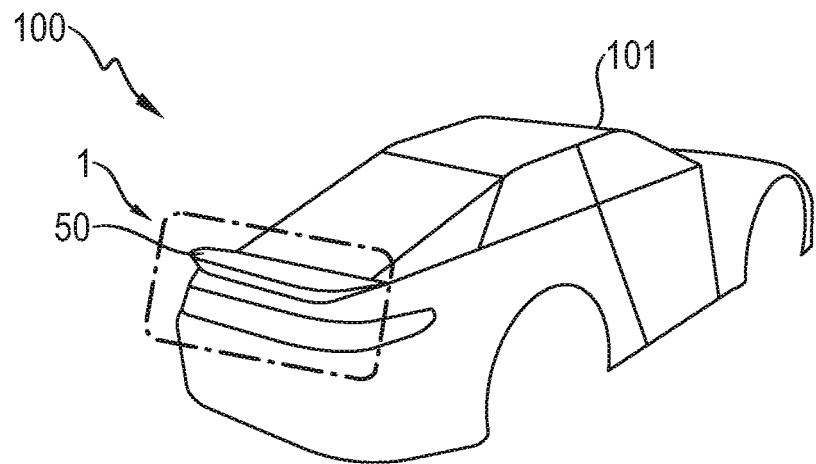
FIG. 1 provides a greatly diagrammatic illustration of a motor vehicle.

Embodiments of the present invention provide an air guiding device for a motor vehicle and, in particular, a passenger car and particularly preferably for a sports car, whereby improved positional accuracy and, in particular, improved force and torque absorption and forwarding are made possible. In particular, assembly without force is to be made possible.

Embodiments of the invention provide air guiding devices for a motor vehicle and, in particular, a passenger car and preferably a sports car. An air guiding device according to an embodiment of the invention for a motor vehicle and, in particular, a passenger car and preferably a sports car comprises at least two wing components, of which one wing component is configured as a rear wing and one wing component is configured as a wing supporting device for securing the rear wing and for forwarding the forces which act on the rear wing. The rear wing and the wing supporting device are connected to one another (in a defined manner) via connecting components. A first one of the connecting components is configured as a trough-shaped receiving device on the one wing component, and a second connecting component which interacts with it is configured as a hammer component on the other wing component. The hammer component comprises a hammer handle and a hammer head which is connected to the former and extends transversely with respect thereto. The hammer head is received in the trough-shaped receiving device (in particular, with an accurate fit).

The air guiding devices according to embodiments of the invention have many advantages. One considerable advantage of an air guiding device according to an embodiment of the invention consists in that the rear wing is received on the air guiding device in a (precisely) defined manner. High positional accuracy in the longitudinal, transverse and vertical direction is achieved by way of this. Assembly without force can be achieved by way of the hammer component being received on the trough-shaped receiving device.

Embodiments of the invention permit a construction which is improved in terms of the requirements of the force-transmitting connecting point between the rear wing and the wing supporting device. As a result, an air guiding device is provided which is configured, in particular, as a rear spoiler, and in the case of which the forces which are absorbed by the rear wing are dissipated in an optimum manner via the wing supporting device which is configured, in particular, as a spoiler support. Improved absorption of force and torque and correspondingly optimum dissipation of the forces and torques are achieved.

Embodiments of the invention make an advantageous refinement possible by way of the use of a hammer component which interacts with a trough-shaped receiving device which is preferably adapted precisely to it. High positional accuracy and optimum absorption and forwarding of force and torque can be ensured.

The hammer head preferably has an elongate body. In particular, the elongate body of the hammer head extends in the transverse direction of the motor vehicle, whereas the hammer handle of the hammer component extends substantially or completely in the longitudinal direction.

The body of the hammer head is preferably of substantially round configuration over a circumferential angle of at least 150°. The body of the hammer head is preferably of substantially round or completely round configuration over at least an angle of 180°, 190°, 200° or more. Refinements of this type make a pivoting movement of the two wing components with respect to one another possible when, during the assembly, the wing component is introduced with the hammer component into the trough-shaped receiving device on the other wing component.

It is possible and preferred that the body of the hammer head is of substantially cylindrical configuration. For example, the body of the hammer head can be of substantially or completely cylindrical configuration over its essential length. It is possible and particularly preferred that the body of the hammer head has a flattened edge on the side of the hammer handle.

It is particularly preferred in all refinements that the hammer head is of rounded configuration at at least one lateral end and particularly preferably at the two lateral ends. The hammer head particularly preferably has in each case a substantially hemispherical design at the two lateral ends. It is also possible that the hammer head has in each case a completely hemispherical design at the two lateral ends.

A rounded and, in particular, a hemispherical configuration of the two lateral ends of the hammer head makes particularly high positional accuracy of the two wing components with respect to one another possible. As a result, a particularly highly accurate fit and reproducibility during assembly can be achieved. The trough-shaped receiving device is preferably adapted to the dimensions of the hammer head.

The hemispherical configuration of the ends of the hammer head makes lateral guidance and precise positioning of the hammer head in the trough-shaped receiving device possible. At the same time, pivoting of the hammer component about the longitudinal axis of the cylindrically configured body of the hammer head can still take place after the introduction of the hammer component and the hammer head into the trough-shaped receiving device.

The trough-shaped receiving device is preferably arranged on an underside of the rear wing in a state in which it is installed as intended. A visually elegant configuration is possible as a result.

The trough-shaped receiving device and the hammer component are preferably fastened to one another in a region closer to a first end of the rear wing. It is likewise preferred that the rear wing and the wing supporting device are connected to one another in a region closer to a second end of the rear wing. The rear wing and the wing supporting device are preferably screwed to one another at the second end of the rear wing. It is also possible, however, that the two wing components are adhesively bonded or riveted to one another or are connected to one another in some other way at the second end of the rear wing or in a region closer to the second end of the rear wing.

The first end and the second end of the rear wing are preferably spaced apart from one another in the longitudinal direction of the vehicle. The rear wing preferably extends at least substantially in the transverse direction of the vehicle.

It is preferred in all refinements that the rear wing is of adjustable configuration. In particular, the height and/or the inclination of the rear wing are/is adjustable. For this purpose, a drive or at least one drive is particularly preferably provided, in order for it to be possible for the rear wing to be adjusted adequately in a manner which is dependent on a current driving situation.

It is preferred in all refinements that the trough-shaped receiving device is part of an insert. In particular, the trough-shaped receiving device is configured as a forged part and/or is machined or mechanically finished. It is preferred that the rear wing consists substantially of a lighter material and that the trough-shaped receiving device which is made from a more stable material is received thereon.

The hammer head preferably positions the rear wing in the trough-shaped receiving device in a manner which is reproducible in the lateral direction.

It is preferred in all refinements that the trough-shaped receiving device is positioned adjacently with respect to an aerodynamic pressure point. An aerodynamic pressure point of this type results from the load of the air flow on the air guiding device while driving. An optimum dissipation of force is made possible by way of positioning of the trough-shaped receiving device adjacently with respect to the aerodynamic pressure point. Here, "adjacently" means that the trough-shaped receiving device is positioned in the vicinity of or at the aerodynamic pressure point. A spacing of the trough-shaped receiving device from an aerodynamic pressure point is preferably less than one quarter and, in particular, less than one eighth of the length of the rear wing in the longitudinal direction of the motor vehicle.

It is possible and preferred that the rear wing which extends in the lateral direction is equipped with in each case one separate wing supporting device at two or more points which are spaced apart laterally.

Overall, embodiments of the invention provide an air guiding device for, in particular, sports cars, a construction which is optimized in terms of the requirements of the force-transmitting connecting point between the rear wing or rear spoiler and a wing component which forwards force such as a wing support or spoiler support being provided. Here, high positional accuracy of the components in the longitudinal, transverse and vertical direction is achieved. Assembly without force is made possible by way of the construction.

It is also a considerable advantage that a high connecting rigidity is made possible in the transverse direction. In advantageous refinements, the hammer head of the hammer component has the basic shape of a horizontally lying cylinder with hemispherical ends on both sides. The forces which are introduced into the cylindrical body of the hammer head are dissipated by the hammer handle in a manner which is optimized in terms of the force flow into the wing supporting device and finally into the vehicle body of the motor vehicle. The hemispherical ends ensure precise and reproducible positioning in the transverse direction. The trough-shaped receiving device can be configured in a near net shape as a forged part. It is also possible that the trough-shaped receiving device is produced by means of machining. The main part of the force flow during operation is dissipated from the rear wing through the trough-shaped receiving device and the hammer component in the direction of the vehicle body. A geometrical position of the connecting point of the trough-shaped receiving device and the hammer component is preferably selected as far as possible such that it is situated at or in the vicinity of the aerodynamic pressure point.

FIG. 1 depicts a greatly diagrammatic illustration of a motor vehicle 100 which is configured as a passenger car 101 and, in particular, as a sports car. In the framed region, the motor vehicle 100 has an air guiding device 1 which is configured, in particular, as a rear wing device or rear spoiler. The air guiding device 1 can be of adjustable configuration, in particular during operation of the motor vehicle 100, and can be set differently, for example, in a manner which is dependent on different driving situations.

Figure 2:
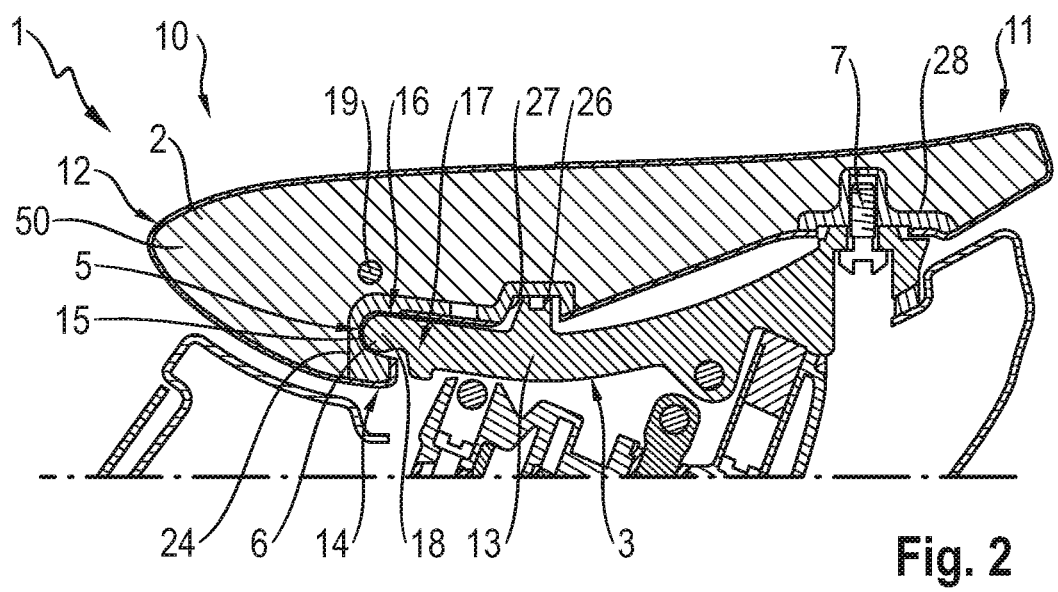
FIG. 2 illustrates a longitudinal section through an air guiding device of the motor vehicle in accordance with FIG. 1.

FIG. 2 shows a longitudinal section through the air guiding device 1 of the motor vehicle 100 from FIG. 1. In the section in accordance with FIG. 2, two wing components 2 and 3 of the air guiding device 1 are visible, the wing component 2 being configured as a rear wing 12, and the wing component 3 being configured as a wing supporting device 13 for receiving and dissipating the forces and torques which occur during operation.

The air guiding device 1 extends from a first end 10 as far as a second end 11, the first end 10 and the second end 11 being arranged spaced apart from one another in the longitudinal direction 9 (cf. FIG. 3) of the motor vehicle. It is possible here that the first end 10 (or the second end 11) is situated further to the rear or further to the front.

The rear wing 12 consists substantially of a light material and is of aerodynamic configuration. Here, two inserts 24 and 28 are received on the rear wing 12 on the side which is situated on the underside 14 of the rear wing 12 during operation, which inserts 24 and 28 consist in each case of a stable material and can accordingly also consist of a heavier material. The insert 24 can be configured, for example, as a metallic forged part. It is also possible that the insert 24 consists of a metal and is brought into its desired shape, for example, by way of machining or milling.

Here, a trough-shaped receiving device 15 is configured on the insert 24, which trough-shaped receiving device 15 serves to receive the hammer head 18 of a hammer component 16. To this end, an inner contour of the trough-shaped receiving device 15 is preferably adapted to an outer contour of the body 20 of the hammer head 18. In particular, the inner contour of the trough-shaped receiving device 15 is of circular segment-shaped or rounded configuration and makes it possible for the hammer head 18 of the hammer component 16 to be introduced into the trough-shaped receiving device 15 with an accurate fit, with the result that a defined seat is achieved in the lateral direction 8 (cf. FIG. 3) and vertically after the introduction.

Pivoting about the central axis of the hammer head 18 is still possible after the introduction, until the connecting component 7 which is configured here as a screw can be screwed into a corresponding internal thread on the insert 28 at the second end 11 of the air guiding device 1. The rear wing 12 and the wing supporting device 13 are then connected fixedly to one another. Before the connecting component 7 is screwed tight, the finger 26 on the wing supporting device 13, which finger 26 engages into the recess 27 of the rear wing 12, already secures the connection between the rear wing 12 and the wing supporting device 13. Assembly without force is made possible overall.

It is particularly advantageous that positioning of the rear wing 12 on the wing supporting device 13 with an accurate fit in the longitudinal direction, in the transverse direction and in the vertical direction is provided.

Figure 3:
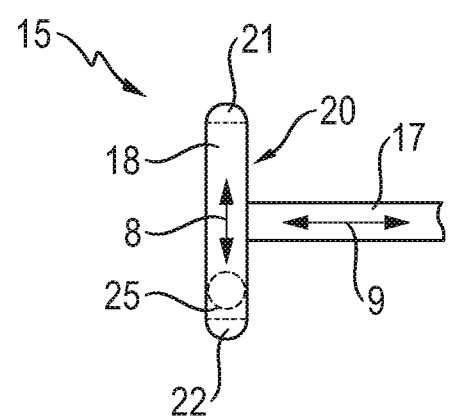
FIG. 3 provides a greatly diagrammatic plan view of a hammer component of the air guiding device in accordance with FIG. 2.

FIG. 3 shows a greatly diagrammatic plan view of the hammer component 16, in which plan view the greatly diagrammatically shown hammer handle 17 and the hammer head 18 which extends transversely with respect thereto at the end of the hammer handle 17 are depicted. The hammer head 18 has an elongate body 20, at the two ends of which in each case one hemispherical end 21 and 22 is configured. Here, the elongate body 20 has a cylindrical cross section 25. A cross section of this type can be manufactured easily and makes pivoting with an accurate fit of the hammer component with respect to the trough-shaped receiving device 15 possible. It is also possible, however, that the body 20 of the hammer head 18 is of approximately semi-cylindrical configuration and has a flattened body edge in the direction of the hammer handle 17. The two ends 21, 22 can then have, for example, the configuration of a quarter-sphere in a corresponding way.

The specific configuration of the trough-shaped receiving device 15 as a connecting component 5 and the hammer component 16 as a connecting component 6 make assembly with an accurate fit and optimum absorption and dissipation of force possible.

The air guiding device 1 has, in particular, a drive device, in order to adjust the height and/or the angle of the air guiding device 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Air guiding device
2 Wing component
3 Wing component
4 Wing component
5 Connecting component
6 Connecting component
7 Connecting component
8 Lateral direction, transverse direction
9 Longitudinal direction
10 First end of 12
11 Second end of 12
12 Rear wing
13 Wing supporting device
14 Underside
15 Trough-shaped receiving device
16 Hammer component 17 Hammer handle
18 Hammer head
19 Aerodynamic pressure point
20 Elongate body
21 Hemispherical end
22 Hemispherical end
24 Insert
25 Cylindrical cross section
26 Finger
27 Recess
28 Insert
50 Rear wing device
100 Motor vehicle
101 Passenger car

What is claimed is:

1. An air guiding device for a motor vehicle, the air guiding device comprising:
   a rear wing;
   a wing supporting device configured to secure the rear wing and to transmit forces which act on the rear wing to a body of the motor vehicle; and
   connecting components configured to connect the rear wing and the wing supporting device to one another,
   wherein a first of the connecting components is configured as a trough-shaped receiving device on one of the rear wing or the wing supporting device,
   wherein a second of the connecting components which interacts with the first connecting component is configured as a hammer component on the other of the rear wing or the wing supporting device,
   wherein the hammer component has a hammer handle and a hammer head which is connected to the hammer handle, extends transversely with respect thereto, and is received in the trough-shaped receiving device, and
   wherein the hammer head has, at two lateral ends, a rounded configuration of substantially hemispherical design.

2. An air guiding device for a motor vehicle, the air guiding device comprising:
   a rear wing;
   a wing supporting device configured to secure the rear wing and to transmit forces which act on the rear wing to a body of the motor vehicle; and
   connecting components configured to connect the rear wing and the wing supporting device to one another,
   wherein a first of the connecting components is configured as a trough-shaped receiving device on one of the rear wing or the wing supporting device,
   wherein a second of the connecting components which interacts with the first connecting component is configured as a hammer component on the other of the rear wing or the wing supporting device,
   wherein the hammer component has a hammer handle and a hammer head which is connected to the hammer handle, extends transversely with respect thereto, and is received in the trough-shaped receiving device,
   wherein the hammer head has an elongate body, and
   wherein the elongate body is of substantially round configuration over a circumferential angle of at least 150°.

3. An air guiding device for a motor vehicle, the air guiding device comprising:
   a rear wing;
   a wing supporting device configured to secure the rear wing and to transmit forces which act on the rear wing to a body of the motor vehicle; and
   connecting components configured to connect the rear wing and the wing supporting device to one another,
   wherein a first of the connecting components is configured as a trough-shaped receiving device on one of the rear wing or the wing supporting device,
   wherein a second of the connecting components which interacts with the first connecting component is configured as a hammer component on the other of the rear wing or the wing supporting device,
   wherein the hammer component has a hammer handle and a hammer head which is connected to the hammer handle, extends transversely with respect thereto, and is received in the trough-shaped receiving device,
   wherein the hammer head has an elongate body, and
   wherein the elongate body is of substantially cylindrical configuration.

4. The air guiding device as claimed in claim 1, wherein the trough-shaped receiving device is arranged on an underside of the rear wing.

5. The air guiding device as claimed in claim 1, wherein the trough-shaped receiving device and the hammer component are fastened to one another in a region closer to a first longitudinal end of the rear wing.

6. The air guiding device as claimed in claim 1, wherein the rear wing and the wing supporting device are connected to one another in a region closer to a second longitudinal end of the rear wing.

7. The air guiding device as claimed in claim 1, wherein the rear wing is adjustable.

8. An air guiding device for a motor vehicle, the air guiding device comprising:
   a rear wing;
   a wing supporting device configured to secure the rear wing and to transmit forces which act on the rear wing to a body of the motor vehicle; and
   connecting components configured to connect the rear wing and the wing supporting device to one another,
   wherein a first of the connecting components is configured as a trough-shaped receiving device on one of the rear wing or the wing supporting device,
   wherein a second of the connecting components which interacts with the first connecting component is configured as a hammer component on the other of the rear wing or the wing supporting device,
   wherein the hammer component has a hammer handle and a hammer head which is connected to the hammer handle, extends transversely with respect thereto, and is received in the trough-shaped receiving device, and
   wherein the trough-shaped receiving device is part of an insert and configured as a forged and/or machined part.

9. The air guiding device as claimed in claim 1, wherein the hammer head positions the rear wing in the trough-shaped receiving device in a manner which is reproducible in a lateral direction.

10. The air guiding device as claimed in claim 1, wherein the trough-shaped receiving device is positioned adjacently with respect to an aerodynamic pressure point.

11. The air guiding device as claimed in claim 1, wherein the rear wing extends in the lateral direction and is equipped with separate wing supporting devices at two or more points which are spaced apart laterally.

* * * * *